Sept. 24, 1935.   O. LAMPERTZ   2,015,480
CARD INDEX SYSTEM FOR KEEPING RECORDS IN A VISIBLE OR HORIZONTAL WAY
Filed June 15, 1929   2 Sheets-Sheet 1
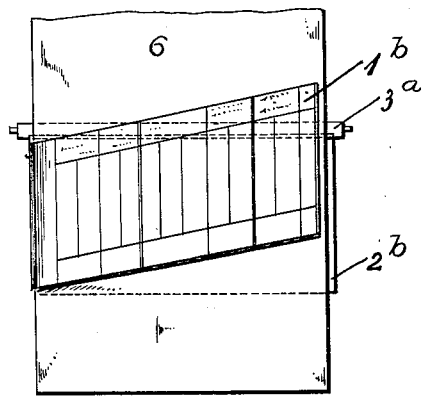
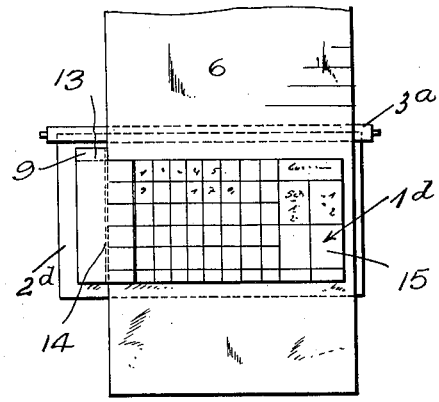
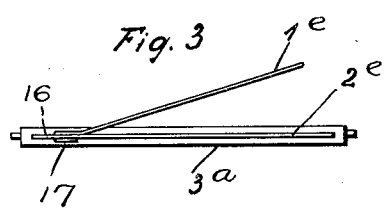
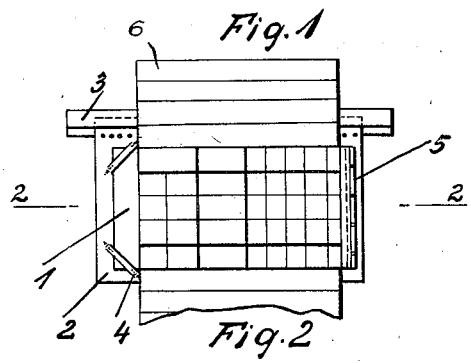
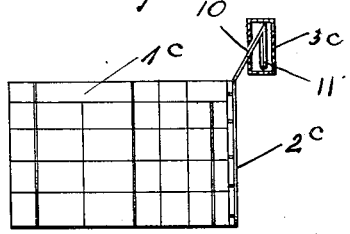

Sept. 24, 1935.  O. LAMPERTZ  2,015,480
CARD INDEX SYSTEM FOR KEEPING RECORDS IN A VISIBLE OR HORIZONTAL WAY
Filed June 15, 1929   2 Sheets-Sheet 2
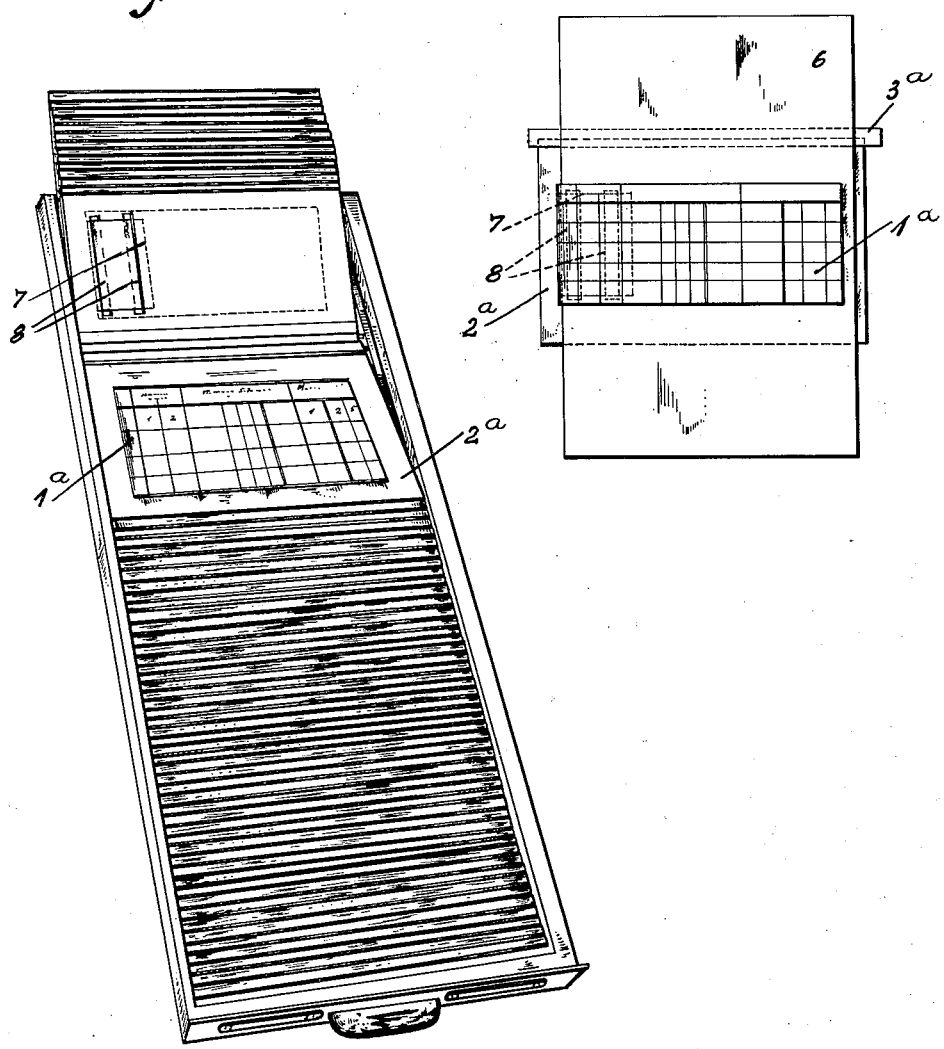

Patented Sept. 24, 1935

2,015,480

UNITED STATES PATENT OFFICE 2,015,480

CARD INDEX SYSTEM FOR KEEPING RECORDS IN A VISIBLE OR HORIZONTAL WAY

Otto Lampertz, Dresden, Germany, assignor to Remington Rand Inc., Buffalo, N. Y.

Application June 15, 1929, Serial No. 371,153
In Germany June 18, 1928

5 Claims. (Cl. 129—16.7)

The present invention relates to a card index system for keeping records in a visible or horizontal way.

Modern bookkeeping makes extensive use of loose leaves which, by means of duplicating paper, permit simultaneous posting on several superimposed sheets whereby bookkeeping work is simplified and perfect conformity of entries on different sheets or leaves insured. The various sheets are usually arranged according to certain principles and kept in suitable containers wherein they either stand upright or occupy a perfectly flat position in graded relation to one another, the horizontal position being, as a rule, preferred for the reason that the sheets thus arranged are more easily accessible for inspection. In such horizontal systems the account sheets are suspended and hinged directly from retaining rails or are inserted in special file pockets which are likewise hinged to suitable rails.

In order to make an entry it was hitherto necessary to remove the cards from the file and to carry them over to other cards or sheets such as, for example, those of the journal on which posting operations had to be performed. This process, in addition to the time lost in manipulation of the cards, also caused the cards to be soiled, lost or incorrectly refiled. To eliminate these drawbacks, a device has been provided by means of which entries can be directly made on cards without the necessity of removal from the file. This device usually consists of a frame to which the journal sheet is secured together with a duplicating sheet and which is placed over the horizontally filed account sheet, the frame being held in position relative to the account sheet by a hook attached to the rail forming the axis of rotation of the sheet. As the journal sheet carried by the frame has to be displaced therein to bring about perfect alinement, it requires some play in its guides, which readily might cause the journal sheet to occupy an oblique position within the frame so that the line of the journal sheet does not coincide perfectly with the one on the account sheet. Moreover, it requires greatest attention and care to bring the vertical lines of journal and account sheet into absolute alinement, and very minute deviations in the trimming or printing of the forms as well as inaccurate arrangement of the frame as to the laymarks will result in inaccurate arrangement of the figures in their respective columns. As these deviations differ in the course of time, the entries on the account sheets will not be placed accurately one below the other but incline more or less to one side or the other. In this way the account sheet gradually loses its originally neat appearance while the work of calculation is considerably handicapped. However, the most serious drawback is that the original entry is made on the journal sheet and only a copy thereof appears on the account sheet. Account sheets are of course longer in use than a journal which is filled up more rapidly and hardly referred to any more after being posted. Furthermore, duplicated entries are blurred easily so that the account sheets quickly acquire an unsightly appearance and illegible figures often cause errors. For the reasons stated the device described has not been introduced generally, it being a postulate in business to make an original entry on the account sheets concerned.

The present invention eliminates the drawbacks mentioned above by arranging the account sheets in the horizontal file in such a way that the journal sheet with its copy sheet can be placed under the account sheet and displaced at will in vertical direction relative to the axis of rotation of the account sheet. This can be achieved in a very simple manner by securing the account sheets to their support not at their upper or lower edge but at one or both side edges.

Fig. 1 is a front view of a support and an account sheet maintained thereon by means of straps and a pocket.

Fig. 2 is a section on the line 2—2 of Fig. 1.

Fig. 3 is an end view of another form of the invention showing a further method of attaching an account sheet to its support.

Fig. 4 is a front view of an account sheet and support showing a further method of connection.

Fig. 5 shows a folded account sheet connected directly to the rail and receiving a journal sheet.

Fig. 6 is a side view showing an account sheet of the type shown in Fig. 5, removably mounted on a special type of rail.

Fig. 7 is a front view of another form of account sheet attached for hinging movement to its support in two directions.

Fig. 8 is a perspective view of a number of supports and account sheets assembled in a tray.

Referring to the drawings, 1 is the account sheet or record-receiving member; 2, its support or holder member and 3, the rail serving for the foldable mounting of the account sheet and its support within the visible record-keeping device or file, Fig. 8. In the form shown in Figs. 1 and 2, the account sheet 1 and its support 2 are connected on both side edges, the connection, as indicated on the left side of Fig. 1, being effected by inserting the corners of the account sheet under strips 4 cut out of the support 2 and on the right side, by inserting the edge of the account sheet in the pocket 5 secured to the support 2 or in any suitable manner. The journal sheet 6 to be used in connection with account sheets mounted in the manner shown in Fig. 1 must of course be narrower so as to fit underneath the account sheet. Both the journal and account sheets are provided with uniformly spaced lines, the top and bottom lines on the account sheet being preferably spaced by the width of a line from the upper and lower edges. By counting or numbering the lines and inserting the journal sheet accordingly under the account sheet, both sheets can be brought into perfect alignment. Another means of attaining absolute coincidence between corresponding lines consists in employing semitransparent paper for the account sheets. The journal sheet to which the copy sheet is preferably secured is aligned laterally by the strips 4 or the pocket 5 or at points forming part of the account sheet so that the lines of the journal sheet are perfectly parallel to the lines of the account sheet.

In the form shown in Figs. 1 and 2 the accurate adjustment of the journal sheet relative to the account sheet is still somewhat difficult because the lines have to be counted and errors thus become possible. For this reason it is advisable to connect the account sheets with their support at one side edge only so that they can be turned about this edge, i. e., about an axis being vertically arranged relative to the axis of rotation of the support of the account sheet or of the account sheet itself (see Figs. 3–5). In the latter case the journal sheet should be broad enough to project laterally beyond the account sheet so that it may be readily ascertained whether the account and journal sheets are in perfect alignment, the journal sheet hugging the lateral point of attachment of the account sheet. In this case, too, the account sheet may be fastened to its support in various ways, for instance by means of strips as shown in Fig. 1. Figs. 4 and 8 illustrate one embodiment of this form of the invention wherein the support 2a is provided with spaced slots 8 arranged in angular relation to the rail 3a. The account sheet 1a is provided with a flap portion 7 which preferably consists of an integral portion of the account sheet folded back on the main body at one side thereof. The account sheet is assembled on the support by threading the flap portion 7 through the slots 8 as shown in Fig. 8. It will be obvious that a pocket of the type shown in Fig. 1 could be substituted for the multiple slots 8 by engaging the support in a similar manner through a single slot and resiliently gripping one edge of the account sheet.

In the form shown in Fig. 5, the account sheet and support are integral and consist of a folded sheet, one section 1b of which is preferably superimposed on the other section 2b with the underlying section clamped directly to the rail 3a, the fold of an account sheet of this type forming a particularly favorable gage for the journal sheet.

It is also found desirable to provide a removably mounted support sheet of the general type as shown in Fig. 5 by securing it to the rail so that it can be connected with or released from the latter only when the rail has been taken out of the file. This modification is shown by way of example in Fig. 6 representing a tubularly bent rail 3c provided with a narrow slot 10 and an account sheet 2c having a sheet extension 1c from one end thereof foldable relative to sheet 2c and also having an upper edge folded upon itself to form a lug portion 11, which is removable or insertable only through the open ends of the rail by longitudinal movement.

Furthermore, according to another modification (Fig. 7), the account sheet 1d may be connected to the support 2d by a portion 9 preferably comprising an integral extension of the upper edge of the sheet which is secured to the underlying support. The remainder of the sheet is thus mounted for hinging movement about the portion 9 which in effect forms a hinge connection with the support. The sheet may be scored or creased at 13 to provide a hinge line parallel to the rail 3a, whereby accurate hinging of the sheet with its free edge parallel to the rail is assured. A second hinge line 14 is also provided on the sheet and is substantially at right-angles to the hinge line 13 in spaced relation to the left-hand margin of the sheet. The hinge line 14 permits the record-receiving portion 15 of the sheet to be hinged relative the remaining portions of the sheet in a direction of rotation at right-angles to the rotation of the support. In this embodiment it is preferred that the portion 9 of the sheet be secured to the support by an adhesive.

Fig. 3 discloses another embodiment of the invention wherein the use of an adhesive as a securing medium is desirable. The support 2e therein is connected to the rail 3a in the usual manner and contains a narrow vertical slot 16 through which a portion 17 of an account sheet 1e is threaded and adhesively secured to the lower face of the support. A portion of the sheet immediately adjacent the slot on the upper face of the support is similarly secured and the main body of the sheet is hingeable relative thereto, and the joint or folding line between such portions of the sheet provides an adequate aligning edge for an inserted journal sheet (not shown).

I claim:—

1. In an index device, a carrier rail, a sheet folded to provide an upper and a lower section, and securing means for connecting a margin of said lower section at right-angles to said fold to said carrier rail.

2. In an index device, a hollow carrier rail having a slotted front wall, a support member having a fold in one marginal edge, said fold being inserted within said carrier rail with the remaining portion extending through said slotted front wall, and a record-receiving member superimposed on said support and attached thereto by one marginal portion for hinging movement at right-angles to said rail.

3. In an index device, a pair of superimposed members connected at one margin, means mounting one of the members by one of its adjacent margins for hinging movement, and a journal sheet slidably mounted between said members and engaging the connected portions thereof for guided movement.

4. In a file, a support, means mounting the support for hinging movement in the file, an account sheet on the support, and a second sheet between the support and account sheet, said support and account sheet being connected to provide a guide for said second sheet whereby said second sheet may be moved therebetween in a direction substantially perpendicular to the axis of rotation of the support.

5. An index device comprising, mounting means, a card holder having one side margin attached to said mounting means, said card holder having spaced elongated retaining members on one face arranged at one end of said card holder in angular relation to the adjacent edge, and a record-receiving card having the corners at one end thereof engaged in said retaining members for detachable connection to said card holder and having the opposite end free for movement away from said card holder on an axis at right angles to the side margin of the card holder.

OTTO LAMPERTZ.